(12) United States Patent
Taherzadeh Boroujeni et al.

(10) Patent No.: US 12,232,189 B2
(45) Date of Patent: Feb. 18, 2025

(54) PHASE TRACKING REFERENCE SIGNAL TRANSMISSION IN A RADIO RESOURCE CONTROL CONNECTION REQUEST MESSAGE

(71) Applicant: QUALCOMM Incorporated, San Diego, CA (US)

(72) Inventors: Mahmoud Taherzadeh Boroujeni, San Diego, CA (US); Tao Luo, San Diego, CA (US); Gokul Sridharan, Sunnyvale, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/652,141

(22) Filed: Feb. 23, 2022

(65) Prior Publication Data

US 2022/0338276 A1    Oct. 20, 2022

Related U.S. Application Data

(60) Provisional application No. 63/175,921, filed on Apr. 16, 2021.

(51) Int. Cl.
| | | |
|---|---|---|
| *H04W 76/10* | (2018.01) | |
| *H04L 5/00* | (2006.01) | |
| *H04W 72/0446* | (2023.01) | |
| *H04W 72/1263* | (2023.01) | |
| *H04W 72/23* | (2023.01) | |
| *H04W 74/0833* | (2024.01) | |
| *H04W 76/20* | (2018.01) | |

(52) U.S. Cl.
CPC .......... *H04W 76/10* (2018.02); *H04L 5/0051* (2013.01); *H04W 72/0446* (2013.01); *H04W 72/1263* (2013.01); *H04W 72/23* (2023.01); *H04W 74/0833* (2013.01); *H04W 76/20* (2018.02)

(58) Field of Classification Search
None
See application file for complete search history.

(56) References Cited

U.S. PATENT DOCUMENTS 10,484,072 B1 *  11/2019  Nammi ................ H04B 7/0639
2014/0321406 A1 * 10/2014  Marinier ............... H04B 7/024
                                                        370/329

(Continued)

FOREIGN PATENT DOCUMENTS

WO    WO-2020238530 A1    12/2020

OTHER PUBLICATIONS

International Search Report and Written Opinion—PCT/US2022/070845—ISA/EPO—May 27, 2022.

(Continued)

*Primary Examiner* — Duc T Duong
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node and prior to transmission of a radio resource control (RRC) connection request message, a phase tracking reference signal (PTRS) indication that indicates a presence of a PTRS. The UE may transmit the RRC connection request message comprising the PTRS based at least in part on the PTRS indication. Numerous other aspects are described.

30 Claims, 8 Drawing Sheets

(56) References Cited

U.S. PATENT DOCUMENTS

| | | | |
|---|---|---|---|
| 2018/0323933 A1* | 11/2018 | Nam | H04L 5/0051 |
| 2019/0215118 A1* | 7/2019 | Moles Cases et al. | H04W 72/0453 |
| 2020/0008270 A1* | 1/2020 | Zhang | H04W 88/06 |
| 2020/0052950 A1* | 2/2020 | Manolakos | H04L 5/0048 |
| 2020/0287751 A1* | 9/2020 | Lee | H04L 25/0226 |
| 2020/0322106 A1* | 10/2020 | Shi | H04L 5/0094 |
| 2021/0051736 A1 | 2/2021 | Jeon et al. | |
| 2021/0167909 A1* | 6/2021 | Nam | H04L 27/2613 |
| 2022/0232643 A1* | 7/2022 | Matsumura | H04W 72/23 |
| 2022/0312500 A1* | 9/2022 | Cao | H04L 1/0003 |

OTHER PUBLICATIONS

Samsung: "RAR Contents", 3GPP TSG RAN WG1 NR AH#3, R1-1715917 RAR Contents, 3rd Generation Partnership Project, Mobile Competence Centre, 650, Route Des Lucioles, F- 06921 Sophia-Antipolis Cedex, France, vol. RAN WG1, No. Nagoya, Japan, Sep. 18, 2017-Sep. 21, 2017, 3 Pages, Sep. 17, 2017, XP051339376.

\* cited by examiner

PHASE TRACKING REFERENCE SIGNAL TRANSMISSION IN A RADIO RESOURCE CONTROL CONNECTION REQUEST MESSAGE

CROSS-REFERENCE TO RELATED APPLICATION

This patent application claims priority to U.S. Provisional Patent Application No. 63/175,921, filed on Apr. 16, 2021, entitled "PHASE TRACKING REFERENCE SIGNAL TRANSMISSION IN A RADIO RESOURCE CONTROL CONNECTION REQUEST MESSAGE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for phase tracking reference signal transmission in a radio resource control connection request message.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a network node and prior to transmission of a radio resource control (RRC) connection request message, a phase tracking reference signal (PTRS) indication that indicates a presence of a PTRS; and transmitting the RRC connection request message comprising the PTRS based at least in part on the PTRS indication.

In some aspects, a method of wireless communication performed by a network node includes transmitting, to a UE and prior to transmission of an RRC connection request message, a PTRS indication that indicates a presence of a PTRS; and receiving the RRC connection request message comprising the PTRS based at least in part on the PTRS indication.

In some aspects, a UE for wireless communication includes a memory; and one or more processors, coupled to the memory, configured to: receive, from a network node and prior to transmission of an RRC connection request message, a PTRS indication that indicates a presence of a PTRS; and transmit the RRC connection request message comprising the PTRS based at least in part on the PTRS indication.

In some aspects, a network node for wireless communication includes a memory; and one or more processors, coupled to the memory, configured to: transmit, to a UE and prior to transmission of an RRC connection request message, a PTRS indication that indicates a presence of a PTRS; and receive the RRC connection request message comprising the PTRS based at least in part on the PTRS indication.

In some aspects, a non-transitory computer-readable medium storing a set of instructions for wireless communication includes one or more instructions that, when executed by one or more processors of a UE, cause the UE to: receive, from a network node and prior to transmission of an RRC connection request message, a PTRS indication that indicates a presence of a PTRS; and transmit the RRC connection request message comprising the PTRS based at least in part on the PTRS indication.

In some aspects, a non-transitory computer-readable medium storing a set of instructions for wireless communication includes one or more instructions that, when executed by one or more processors of a network node, cause the network node to: transmit, to a UE and prior to transmission of an RRC connection request message, a PTRS indication that indicates a presence of a PTRS; and receive the RRC connection request message comprising the PTRS based at least in part on the PTRS indication.

In some aspects, an apparatus for wireless communication includes means for receiving, from a network node and prior to transmission of an RRC connection request message, a PTRS indication that indicates a presence of a PTRS; and means for transmitting the RRC connection request message comprising the PTRS based at least in part on the PTRS indication.

In some aspects, an apparatus for wireless communication includes means for transmitting, to a UE and prior to transmission of an RRC connection request message, a PTRS indication that indicates a presence of a PTRS; and means for receiving the RRC connection request message comprising the PTRS based at least in part on the PTRS indication.

Aspects generally include a method, apparatus, system, computer program product, non-transitory computer-readable medium, user equipment, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
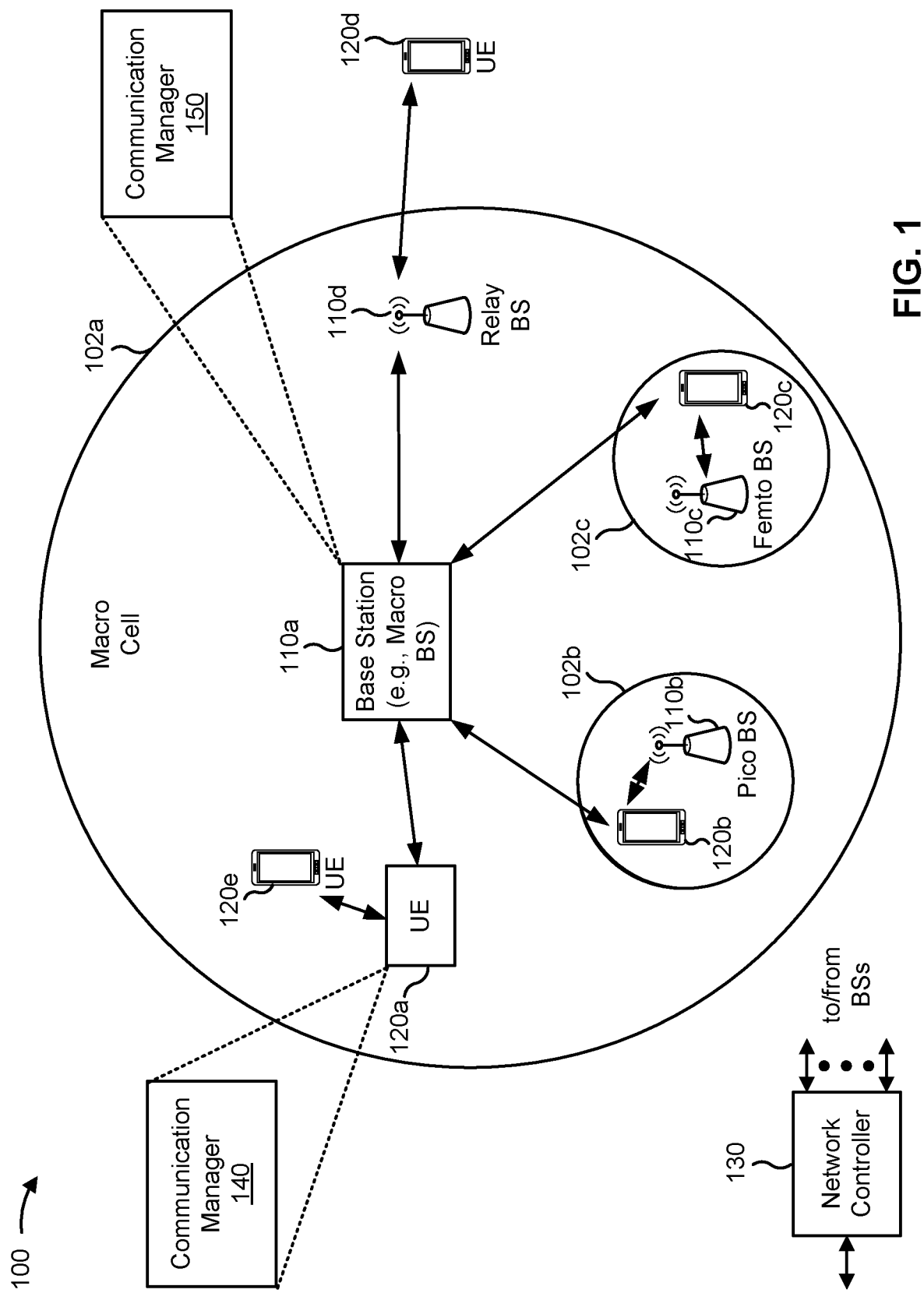
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "g B", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As described herein, a node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, the UE 120 may include a communication manager 140. As described in more detail elsewhere herein, the communication manager 140 may receive, from a network node and prior to transmission of a radio resource control (RRC) connection request message, a phase tracking reference signal (PTRS) indication that indicates a presence of a PTRS; and transmit the RRC connection request message comprising the PTRS based at least in part on the PTRS indication. Additionally, or alternatively, the communication manager 140 may perform one or more other operations described herein.

In some aspects, the network node 110 may include a communication manager 150. As described in more detail elsewhere herein, the communication manager 150 may transmit, to a UE and prior to transmission of an RRC connection request message, a PTRS indication that indicates a presence of a PTRS; and receive the RRC connection request message comprising the PTRS based at least in part on the PTRS indication. Additionally, or alternatively, the communication manager 150 may perform one or more other operations described herein.

As indicated above, FIG. 1 is provided as an example. Other examples may differ from what is described with regard to FIG. 1.

Figure 2:
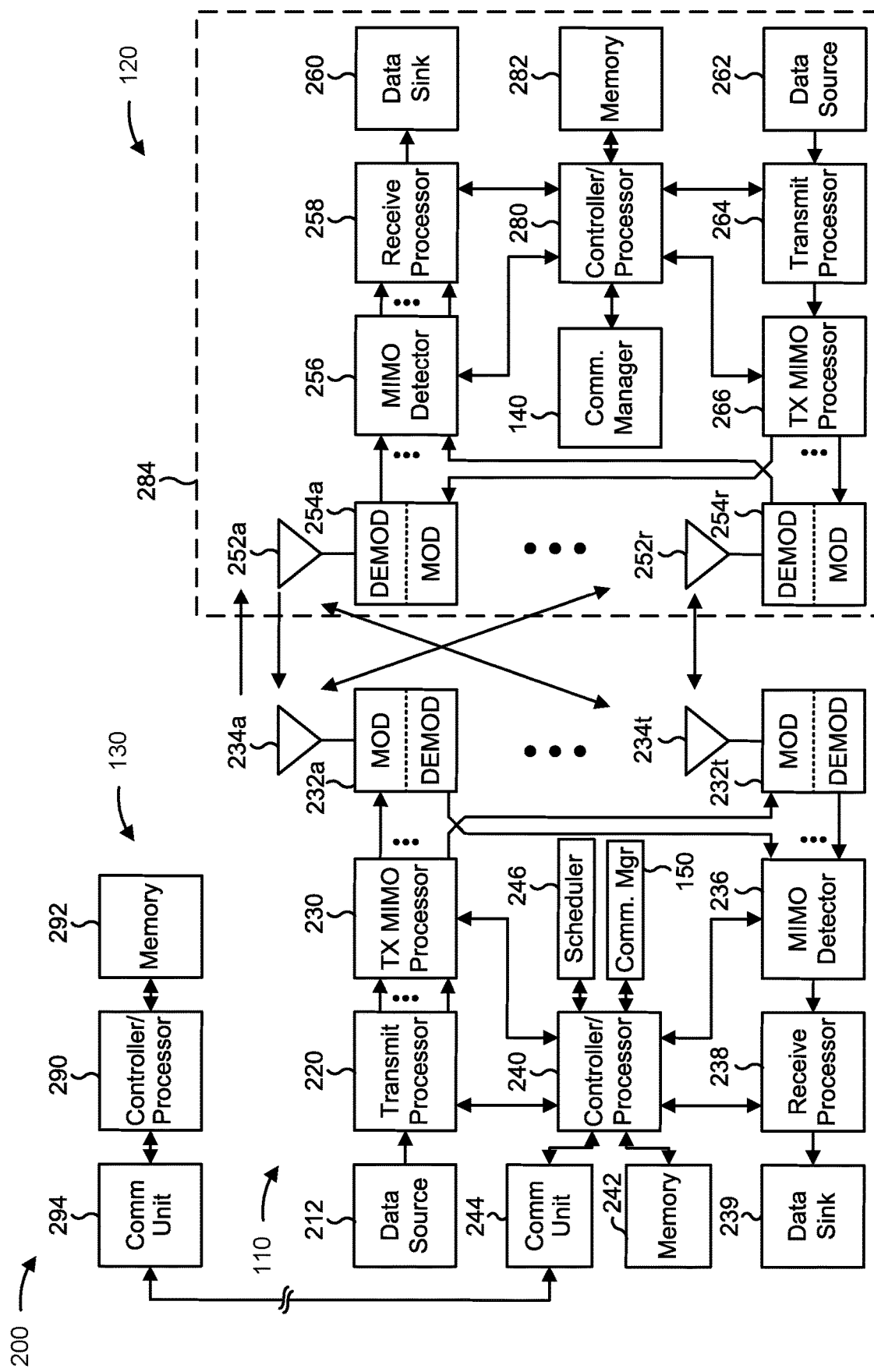
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

In some aspects, the term "base station" (e.g., the base station 110) may refer to an aggregated base station, a disaggregated base station, and/or one or more components of a disaggregated base station. For example, in some aspects, "base station" may refer to a control unit, a distributed unit, a plurality of control units, a plurality of distributed units, and/or a combination thereof. In some aspects, "base station" may refer to one device configured to perform one or more functions such as those described above in connection with the base station 110. In some aspects, "base station" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" may refer to any one or more of those different devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-8).

Controller/processor 240 of base station 110, controller/processor 280 of UE 120, and/or any other component(s) of FIG. 2 may perform one or more techniques associated with PTRS transmission in an RRC connection request message of a random access channel (RACH) procedure, as described in more detail elsewhere herein. In some aspects, the network node described herein may be, be similar to, include, or be included in, a base station (e.g., the base station 110). For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for receiving, from a network node and prior to transmission of an RRC connection request message, PTRS indication that indicates a presence of a PTRS; or means for transmitting the RRC connection request message comprising the PTRS based at least in part on the PTRS indication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the network node includes means for transmitting, to a UE and prior to transmission of an RRC connection request message, a PTRS indication that indicates a presence of a PTRS; or means for receiving the RRC connection request message comprising the PTRS based at least in part on the PTRS indication. The means for the network node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
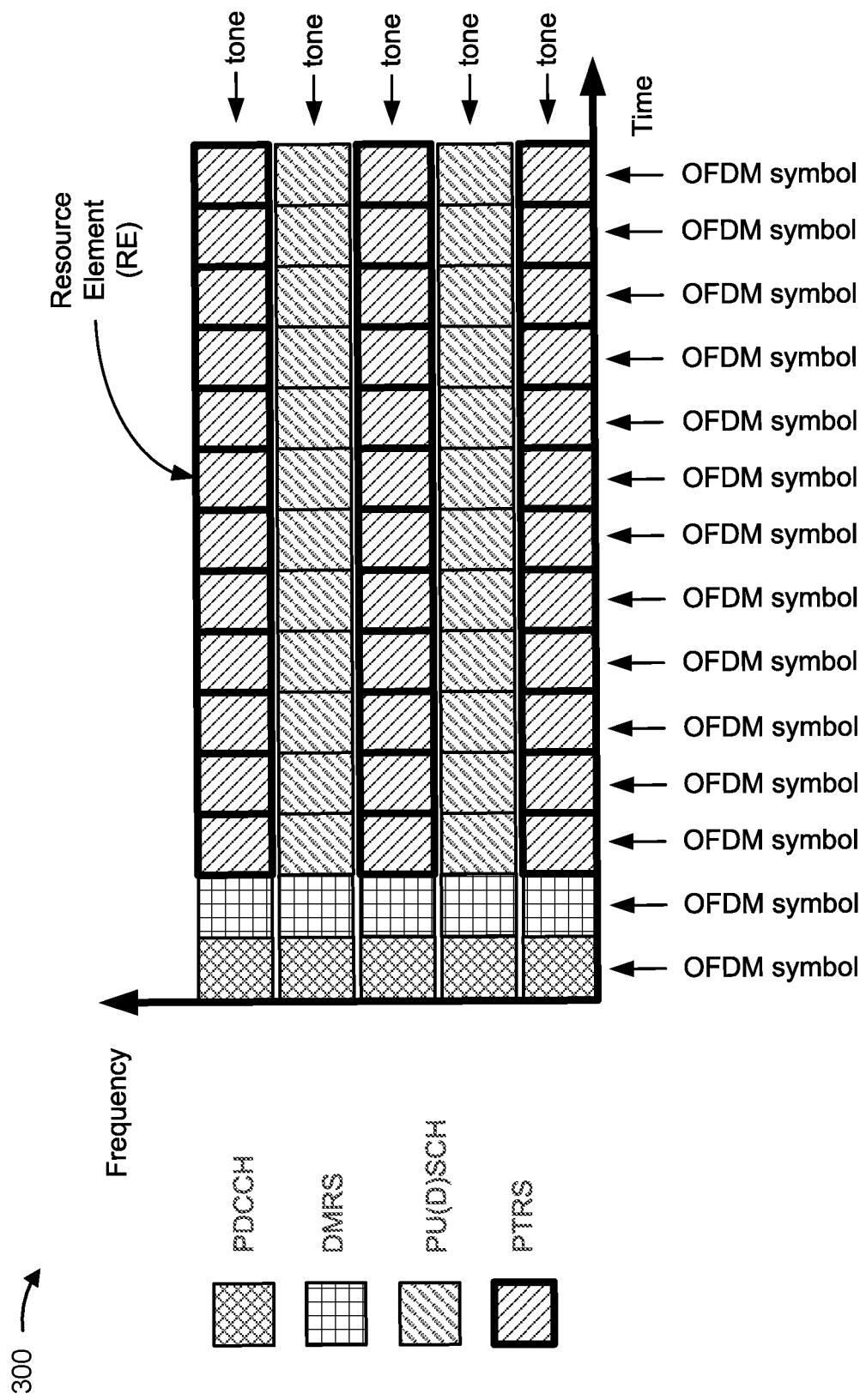
FIG. 3 is a diagram illustrating an example of a phase tracking reference signal (PTRS), in accordance with the present disclosure.

FIG. 3 is a diagram illustrating an example 300 of an assignment of PTRSs and other signals and channels to resource elements, in accordance with the present disclosure.

FIG. 3 illustrates PTRS pilot signals (also referred to as PTRS pilot tones, PTRS signals, and/or PTRSs) for an orthogonal frequency division multiplexing with a cyclic prefix (CP-OFDM) communication system. PTRSs may be continuous (as illustrated) or discontinuous in the time domain. For a UE 120, the PTRSs may occupy one tone or several tones, based at least in part on a scheduled bandwidth, an MCS, a signal-to-noise ratio (SNR), an interference level, a port mapping, and/or another attribute that may impact the received signal quality of communication signals. A tone may be referred to as a subcarrier.

PTRSs may be used by the UE 120 and/or the base station 110 for phase tracking, for phase estimation, and/or to correct oscillator phase noise, especially for millimeter wave communications. A PTRS may be embedded in a physical downlink shared channel (PDSCH) resource allocation or a physical uplink shared channel (PUSCH) allocation. In some cases, one PTRS port may be configured for downlink communication (e.g., within a PDSCH resource allocation), and up to two PTRS ports may be configured for uplink communication (e.g., within a PUSCH resource allocation).

For CP-OFDM communication, a PTRS may use the same sequence as a corresponding DMRS, which may be a Gold sequence (e.g., a quadrature phase-shift keying (QPSK) modulated Gold sequence). In some aspects, a correspondence between a PTRS port and a DMRS port may be indicated to the UE by a base station (e.g., via a DMRS-PTRS association indicated in downlink control information). In some cases, for uplink communications, a greater number of DMRS ports (e.g., up to 4 DMRS ports) may be configured for a UE than a number of PTRS ports (e.g., up to 2 PTRS ports) configured for the UE.

A higher SNR in the PTRSs may provide a more accurate phase error estimation. Accordingly, in some aspects, the PTRSs may be located in the tones with good channel conditions, high SNR, and/or high signal-to-interference-plus-noise ratio (SINR), which may result in more accurate phase tracking at the UE 120. Increasing the number of PTRSs may provide more accurate phase error estimation. For example, an increased number of PTRSs may allow for thermal noise to be averaged out over the larger number of PTRSs. Additionally, an increased number of PTRSs may allow for frequency diversity to be exploited.

However, using a large number of PTRSs may increase overhead. Furthermore, the gain from increasing the number of PTRSs may saturate for a given number of PTRSs in a scheduled bandwidth. Accordingly, UEs 120 with a large scheduled bandwidth may use a sparser PTRS frequency domain pattern. Conversely, UEs 120 with a small scheduled bandwidth may use a denser PTRS frequency domain pattern. PTRS may be relatively sparse in frequency compared to DMRS. For example, one PTRS resource element (RE) may be used in every 2 or 4 resource blocks (RBs), while 4 or 6 DMRS REs may be used in every RB. As shown in FIG. 3, PTRS may be relatively dense in time as compared to DMRS.

The required number of PTRSs to achieve a certain performance requirement (e.g., a bit error rate less than 0.5%, 1%, 2%, or another threshold), for a given scheduled bandwidth may depend on a number of factors, such as channel conditions, UE speed, UE capability, UE processing power, UE battery charge, mobility, and other factors that may impact a communication system's performance. A communication system with too few PTRSs may result in more retransmissions due to channel errors, which reduces throughput. A system with too many PTRSs may utilize valuable system bandwidth for a minimal decrease in channel error rate.

Some communication systems may use a fixed PTRS pattern (e.g., in the time domain and/or frequency domain), such as the PTRS pattern shown in FIG. 3. In this case, the density of PTRSs may be fixed both in the number of PTRSs and the resource elements that carry PTRSs. Alternatively, some communication systems may use a flexible PTRS configuration, where resource elements carrying PTRSs may be flexibly configured. In some cases, a PTRS is configured using RRC messages.

In some cases, a PTRS may be used to facilitate joint channel estimation such as, for example, when a UE is not capable of maintaining sufficient phase continuity for joint channel estimation using DMRS bundling. A DMRS may include a reference signal that is generated from a base sequence, such as a Zadoff-Chu sequence or a Gold sequence. A DMRS may carry information used to estimate a radio channel for demodulation of an associated physical channel (e.g., physical downlink control channel (PDCCH), PDSCH, physical uplink control channel (PUCCH), or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs are used for both downlink communications and uplink communications.

In some cases, a UE may associate or bundle a plurality of time-domain resources for purposes of joint channel estimation (which may be referred to as uplink DMRS bundling and/or DMRS bundling), in which case the base station may assume that the same precoder is used across the plurality of time-domain resources and that DMRS transmissions across the plurality of time-domain resources may be coherently filtered to increase the accuracy of the channel estimation.

However, in some cases, whether a UE supports PUSCH DMRS bundling and/or PUCCH DMRS bundling can depend on one or more UE capabilities for phase continuity maintenance. In some cases, a UE may not be capable of phase continuity maintenance suitable for DMRS bundling. In some cases, even if a UE can maintain phase continuity, indicating this capability to the base station before an RRC connection request message in a RACH procedure may result in excessive overhead for a physical RACH (PRACH) request. In some cases, a PTRS may be used to facilitate joint channel estimation for the RRC connection request message, which has been found to improve network performance in some cases. However, RRC signaling, which can be used to configure PTRSs, is not available during initial access and/or RACH procedures. As a result, facilitating joint channel estimation using PTRS may result in excessive overhead and computational resource consumption.

Some aspects of techniques and apparatuses described herein may facilitate using PTRSs for joint channel estimation associated with an RRC connection request message. For example, in some aspects, a network node may transmit, and a UE may receive, a PTRS indication that indicates a presence of the PTRS and/or PTRS transmission parameters. The UE may transmit the RRC connection request message including the PTRS based at least in part on the PTRS indication. In this way, some aspects may facilitate reducing excessive overhead and computational resource consumption and positively impacting network performance.

As indicated above, FIG. 3 is provided as an example. Other examples may differ from what is described with regard to FIG. 3.

Figure 4:
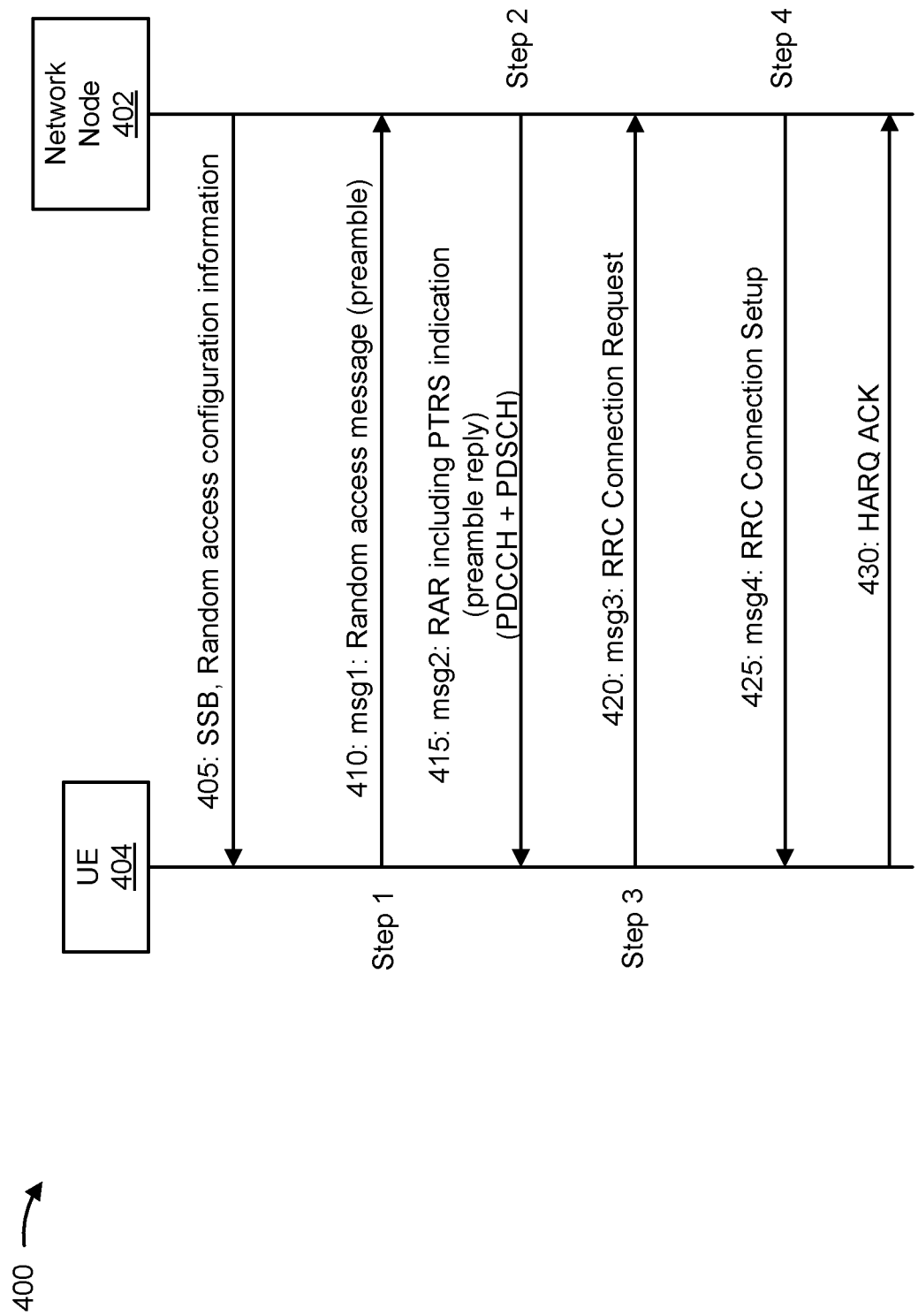
FIG. 4 is a diagram illustrating an example associated with PTRS transmission in a radio resource control (RRC) connection request message in a random access channel (RACH) procedure, in accordance with the present disclosure.

FIG. 4 is a diagram illustrating an example 400 associated with PTRS transmission in an RRC connection request message in a four-step RACH procedure, in accordance with the present disclosure. As shown in FIG. 4, a network node 402 and a UE 404 may communicate with one another to perform the four-step RACH procedure.

As shown by reference number 405, the network node 402 may transmit, and the UE 404 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving a random access response (RAR).

As shown by reference number 410, the UE 404 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step RACH procedure. The random access message may include a random access preamble identifier.

As shown by reference number 415, the network node 402 may transmit a RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 404 in msg1). Additionally, or alternatively, the RAR may indicate a resource allocation to be used by the UE 404 to transmit message 3 (msg3).

In some aspects, as shown, the RAR may include a PTRS indication. In some aspects, the PTRS indication may be transmitted by the network node separate from the RAR but still prior to transmission of an RRC connection request message. The PTRS indication may indicate a presence of a PTRS. In some aspects, the PTRS indication may indicate one or more parameters associated with transmitting a PTRS and/or a PTRS repetition. As used herein, "repetition" refers to a communication that is transmitted more than one time and refers to the initial transmission of that communication or any subsequent retransmission of that communication.

For example, in some aspects, the UE 404 may obtain a PTRS repetition configuration. The PTRS repetition configuration may indicate at least one parameter associated with transmitting a plurality of repetitions of the PTRS. The at least one parameter may indicate at least one of a transmission time or a repetition frequency density. In some aspects, the UE 404 may obtain the PTRS repetition configuration by receiving system information (SI) that indicates the PTRS repetition configuration. For example, the PTRS repetition configuration may be indicated by a SIB (e.g., a SIB1). In some aspects, the PTRS repetition configuration may be indicated by a wireless communication standard.

In some aspects, the at least one parameter associated with transmitting the plurality of repetitions of the PTRS may be based at least in part on at least one parameter associated with transmission of the RRC connection request message. The at least one parameter associated with transmission of the RRC connection request message may indicate at least one of a number of repetitions of the RRC connection request message, an MCS, or a bandwidth.

In some aspects, as part of the second step of the four-step random access procedure, the network node 402 may transmit a PDCCH communication for the RAR. The PDCCH communication may schedule a PDSCH communication that includes the RAR. For example, the PDCCH communication may indicate a resource allocation for the PDSCH communication. In some aspects, the PDCCH communication may indicate a resource allocation for the RRC connection request message. The resource allocations may be indicated by one or more downlink control information (DCI) transmissions associated with the PDCCH communication. In some aspects, the PDCCH communication may include the PTRS indication. Also, as part of the second step of the four-step random access procedure, the network node 402 may transmit the PDSCH communication for the RAR, as scheduled by the PDCCH communication. The RAR may be included in a MAC protocol data unit (PDU) of the PDSCH communication.

In some aspects, the UE 404 may receive the PTRS indication by interpreting a bitfield of the RAR to identify the PTRS indication. In some aspects, the PDCCH may schedule a retransmission of the RRC connection request message and receiving the PTRS indication may include interpreting a bitfield of a downlink control information transmission corresponding to the PDCCH to identify the PTRS indication. In some aspects, receiving the PTRS indication may include receiving an indication of an RRC connection request message repetition. In some aspects, the UE 404 may receive the PTRS indication by receiving an indication of a number of repetitions of the RRC connection request message.

In some aspects, the UE 404 may receive the PTRS indication by determining that an indicating condition is satisfied. For example, in some aspects, determining that the indicating condition is satisfied may include determining that a consecutive pair of RRC connection request message repetitions include a first repetition associated with a first uplink slot and a second repetition associated with a second uplink slot, wherein at least one third uplink slot is disposed between the first uplink slot and the second uplink slot. In some aspects, the network node 402 may transmit, and the UE 404 may receive, a PTRS indication configuration that indicates one or more rules for implicit indication of the presence of the PTRS. In some aspects, receiving the PTRS indication configuration may include receiving remaining minimum system information (RMSI). A SIB may indicate the RMSI.

As shown by reference number 420, the UE 404 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a PUSCH communication (e.g., an RRC connection request).

As shown by reference number 425, the network node 402 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 430, if the UE 404 successfully receives the RRC connection setup message, the UE 404 may transmit a hybrid automatic repeat request (HARQ) acknowledgement (ACK).

As indicated above, FIG. 4 is provided as an example. Other examples may differ from what is described with regard to FIG. 4.

Figure 5:
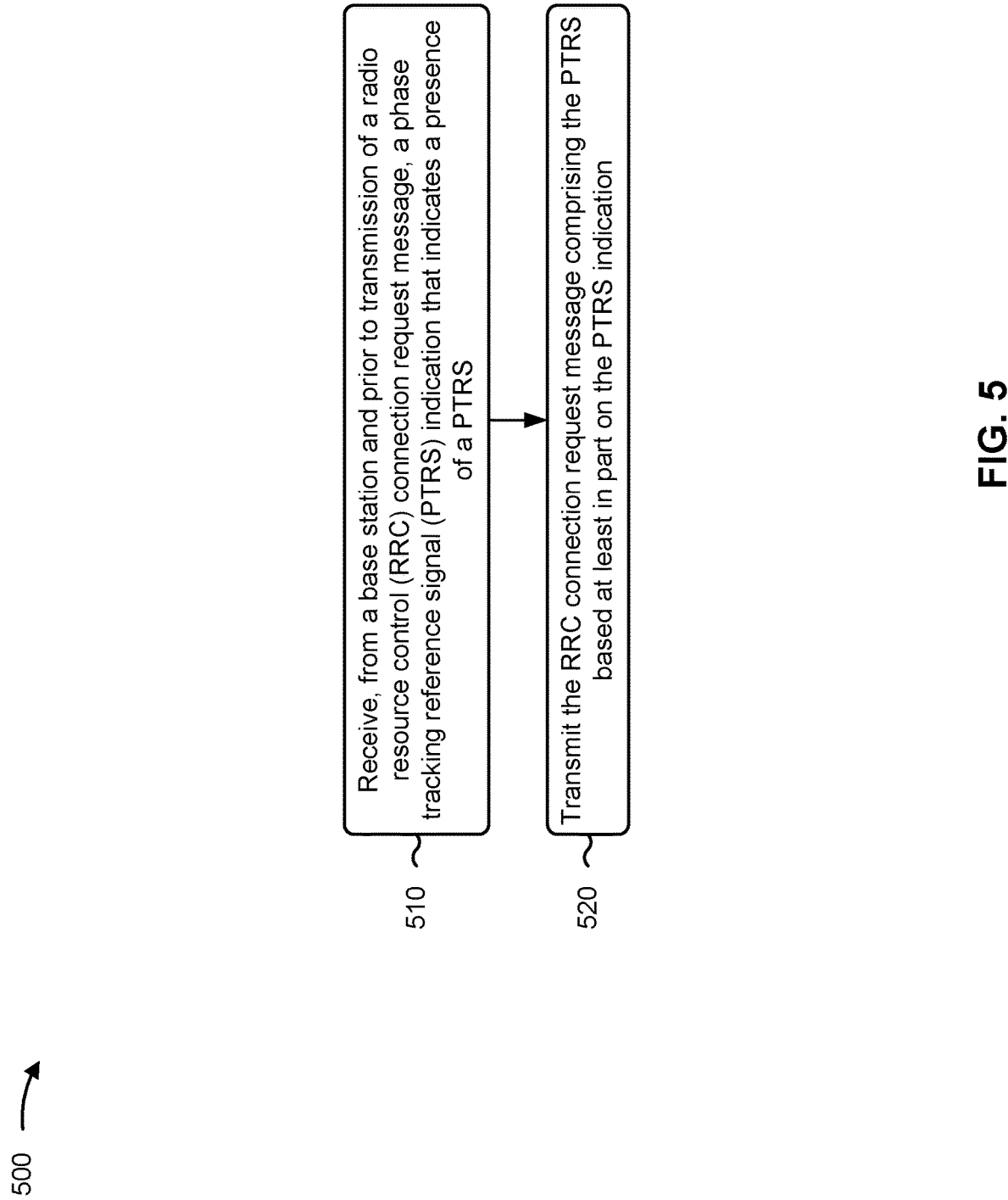
FIGS. 5 and 6 are diagrams illustrating example processes associated with PTRS transmission in an RRC connection request message in a RACH procedure, in accordance with the present disclosure.

FIG. 5 is a diagram illustrating an example process 500 performed, for example, by a UE, in accordance with the present disclosure. Example process 500 is an example where the UE (e.g., UE 404) performs operations associated with phase tracking reference signal transmission in a radio resource control connection request message.

As shown in FIG. 5, in some aspects, process 500 may include receiving, from a network node and prior to transmission of an RRC connection request message, a PTRS indication that indicates a presence of a PTRS (block 510). For example, the UE (e.g., using reception component 702, depicted in FIG. 7) may receive, from a network node and prior to transmission of an RRC connection request message, a PTRS indication that indicates a presence of a PTRS, as described above.

As further shown in FIG. 5, in some aspects, process 500 may include transmitting the RRC connection request message comprising the PTRS based at least in part on the PTRS indication (block 520). For example, the UE (e.g., using transmission component 704, depicted in FIG. 7) may transmit the RRC connection request message comprising the PTRS based at least in part on the PTRS indication, as described above.

Process 500 may include additional aspects, such as any single aspect or any combination of aspects described below and/or in connection with one or more other processes described elsewhere herein.

In a first aspect, receiving the PTRS indication comprises receiving an RAR that includes the PTRS indication.

In a second aspect, alone or in combination with the first aspect, receiving the PTRS indication comprises interpreting a bitfield of the RAR to identify the PTRS indication.

In a third aspect, alone or in combination with one or more of the first and second aspects, receiving the PTRS indication comprises receiving a PDCCH transmission that includes the PTRS indication, wherein the PDCCH transmission schedules a random access response.

In a fourth aspect, alone or in combination with the third aspect, receiving the PTRS indication comprises interpreting a bitfield of a downlink control information transmission corresponding to the PDCCH to identify the PTRS indication.

In a fifth aspect, alone or in combination with one or more of the first through fourth aspects, receiving the PTRS indication comprises receiving a PDCCH that includes the PTRS indication, wherein the PDCCH schedules a retransmission of the RRC connection request message.

In a sixth aspect, alone or in combination with the fifth aspect, receiving the PTRS indication comprises interpreting a bitfield of a downlink control information transmission corresponding to the PDCCH to identify the PTRS indication.

In a seventh aspect, alone or in combination with one or more of the first through sixth aspects, receiving the PTRS indication comprises receiving an indication of an RRC connection request message repetition.

In an eighth aspect, alone or in combination with one or more of the first through seventh aspects, receiving the PTRS indication comprises receiving an indication of a number of repetitions of the RRC connection request message.

In a ninth aspect, alone or in combination with one or more of the first through eighth aspects, receiving the PTRS indication comprises determining that an indicating condition is satisfied.

In a tenth aspect, alone or in combination with the ninth aspect, determining that the indicating condition is satisfied comprises determining that a consecutive pair of RRC connection request message repetitions include a first repetition associated with a first uplink slot and a second repetition associated with a second uplink slot, wherein at least one third uplink slot is disposed between the first uplink slot and the second uplink slot.

In an eleventh aspect, alone or in combination with one or more of the first through tenth aspects, process 500 includes receiving a PTRS indication configuration that indicates one or more rules for implicit indication of the presence of the PTRS.

In a twelfth aspect, alone or in combination with the eleventh aspect, receiving the PTRS indication configuration comprises receiving RMSI.

In a thirteenth aspect, alone or in combination with the twelfth aspect, receiving the RMSI comprises receiving an SIB that indicates the RMSI.

In a fourteenth aspect, alone or in combination with the thirteenth aspects, process 500 includes obtaining a PTRS repetition configuration that indicates at least one parameter associated with transmitting a plurality of repetitions of the PTRS.

In a fifteenth aspect, alone or in combination with the fourteenth aspect, the at least one parameter indicates at least one of a transmission time or a repetition frequency density.

In a sixteenth aspect, alone or in combination with one or more of the fourteenth through fifteenth aspects, obtaining the PTRS repetition configuration comprises receiving system information that indicates the PTRS repetition configuration.

In a seventeenth aspect, alone or in combination with one or more of the fourteenth through sixteenth aspects, the PTRS repetition configuration is indicated by a wireless communication standard.

In an eighteenth aspect, alone or in combination with one or more of the fourteenth through seventeenth aspects, the at least one parameter associated with transmitting the plurality of repetitions of the PTRS is based at least in part on at least one parameter associated with transmission of the RRC connection request message.

In a nineteenth aspect, alone or in combination with the eighteenth aspect, the at least one parameter associated with transmission of the RRC connection request message indicates at least one of a number of repetitions of the RRC connection request message, a modulation and coding scheme, or a bandwidth.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
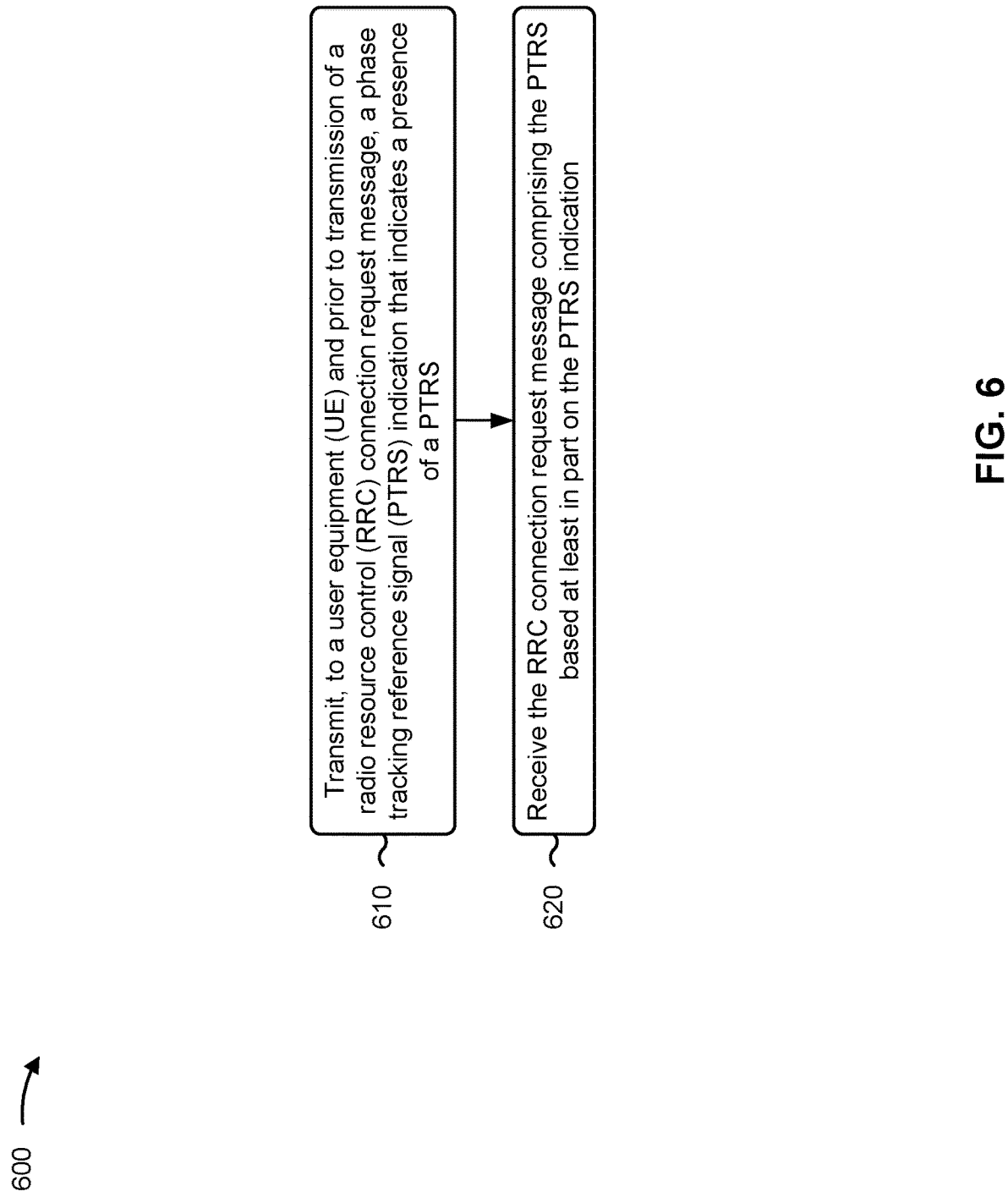

FIG. 6 is a diagram illustrating an example process 600 performed, for example, by a network node, in accordance with the present disclosure. Example process 600 is an example where the network node (e.g., network node 402) performs operations associated with phase tracking reference signal transmission in a radio resource control connection request message.

As shown in FIG. 6, in some aspects, process 600 may include transmitting, to a UE and prior to transmission of an RRC connection request message, a PTRS indication that indicates a presence of a PTRS (block 610). For example, the network node (e.g., using transmission component 804, depicted in FIG. 8) may transmit, to a UE and prior to transmission of an RRC connection request message, a PTRS indication that indicates a presence of a PTRS, as described above.

As further shown in FIG. 6, in some aspects, process 600 may include receiving the RRC connection request message comprising the PTRS based at least in part on the PTRS indication (block 620). For example, the network node (e.g., using reception component 802, depicted in FIG. 8) may receive the RRC connection request message comprising the PTRS based at least in part on the PTRS indication, as described above.

Process 600 may include additional aspects, such as any single aspect or any combination of aspects described below and/or in connection with one or more other processes described elsewhere herein.

In a first aspect, transmitting the PTRS indication comprises transmitting an RAR that includes the PTRS indication.

In a second aspect, alone or in combination with the first aspect, the PTRS indication is based at least in part on an interpretation of a bitfield of the RAR.

In a third aspect, alone or in combination with one or more of the first and second aspects, transmitting the PTRS indication comprises transmitting a PDCCH transmission that includes the PTRS indication, wherein the PDCCH transmission schedules a random access response.

In a fourth aspect, alone or in combination with the third aspect, the PTRS indication is based at least in part on an interpretation of a bitfield of a DCI transmission corresponding to the PDCCH.

In a fifth aspect, alone or in combination with one or more of the first through fourth aspects, transmitting the PTRS indication comprises transmitting a PDCCH that includes the PTRS indication, wherein the PDCCH schedules a retransmission of the RRC connection request message.

In a sixth aspect, alone or in combination with the fifth aspect, the PTRS indication is based at least in part on an interpretation of a bitfield of a downlink control information transmission corresponding to the PDCCH.

In a seventh aspect, alone or in combination with one or more of the first through sixth aspects, transmitting the PTRS indication comprises transmitting an indication of an RRC connection request message repetition.

In an eighth aspect, alone or in combination with one or more of the first through seventh aspects, transmitting the PTRS indication comprises transmitting an indication of a number of repetitions of the RRC connection request message.

In a ninth aspect, alone or in combination with one or more of the first through eighth aspects, the PTRS indication is based at least in part on a determination that an indicating condition is satisfied.

In a tenth aspect, alone or in combination with the ninth aspect, the determination that the indicating condition is satisfied is based at least in part on a determination that a consecutive pair of RRC connection request message repetitions include a first repetition associated with a first uplink slot and a second repetition associated with a second uplink slot, wherein at least one third uplink slot is disposed between the first uplink slot and the second uplink slot.

In an eleventh aspect, alone or in combination with one or more of the first through tenth aspects, process 600 includes transmitting a PTRS indication configuration that indicates one or more rules for implicit indication of the presence of the PTRS.

In a twelfth aspect, alone or in combination with the eleventh aspect, transmitting the PTRS indication configuration comprises transmitting RMSI.

In a thirteenth aspect, alone or in combination with the twelfth aspect, transmitting the RMSI comprises transmitting a SIB that indicates the RMSI.

In a fourteenth aspect, alone or in combination with one or more of the first through thirteenth aspects, a PTRS repetition configuration indicates at least one parameter associated with transmitting a plurality of repetitions of the PTRS.

In a fifteenth aspect, alone or in combination with the fourteenth aspect, the at least one parameter indicates at least one of a transmission time or a repetition frequency density.

In a sixteenth aspect, alone or in combination with one or more of the fourteenth through fifteenth aspects, process 600 includes transmitting system information that indicates the PTRS repetition configuration.

In a seventeenth aspect, alone or in combination with one or more of the fourteenth through sixteenth aspects, the PTRS repetition configuration is indicated by a wireless communication standard.

In an eighteenth aspect, alone or in combination with one or more of the fourteenth through seventeenth aspects, the at least one parameter associated with transmitting the plurality of repetitions of the PTRS is based at least in part on at least one parameter associated with transmission of the RRC connection request message.

In a nineteenth aspect, alone or in combination with the eighteenth aspect, the at least one parameter associated with transmission of the RRC connection request message indicates at least one of a number of repetitions of the RRC connection request message, a modulation and coding scheme, or a bandwidth.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
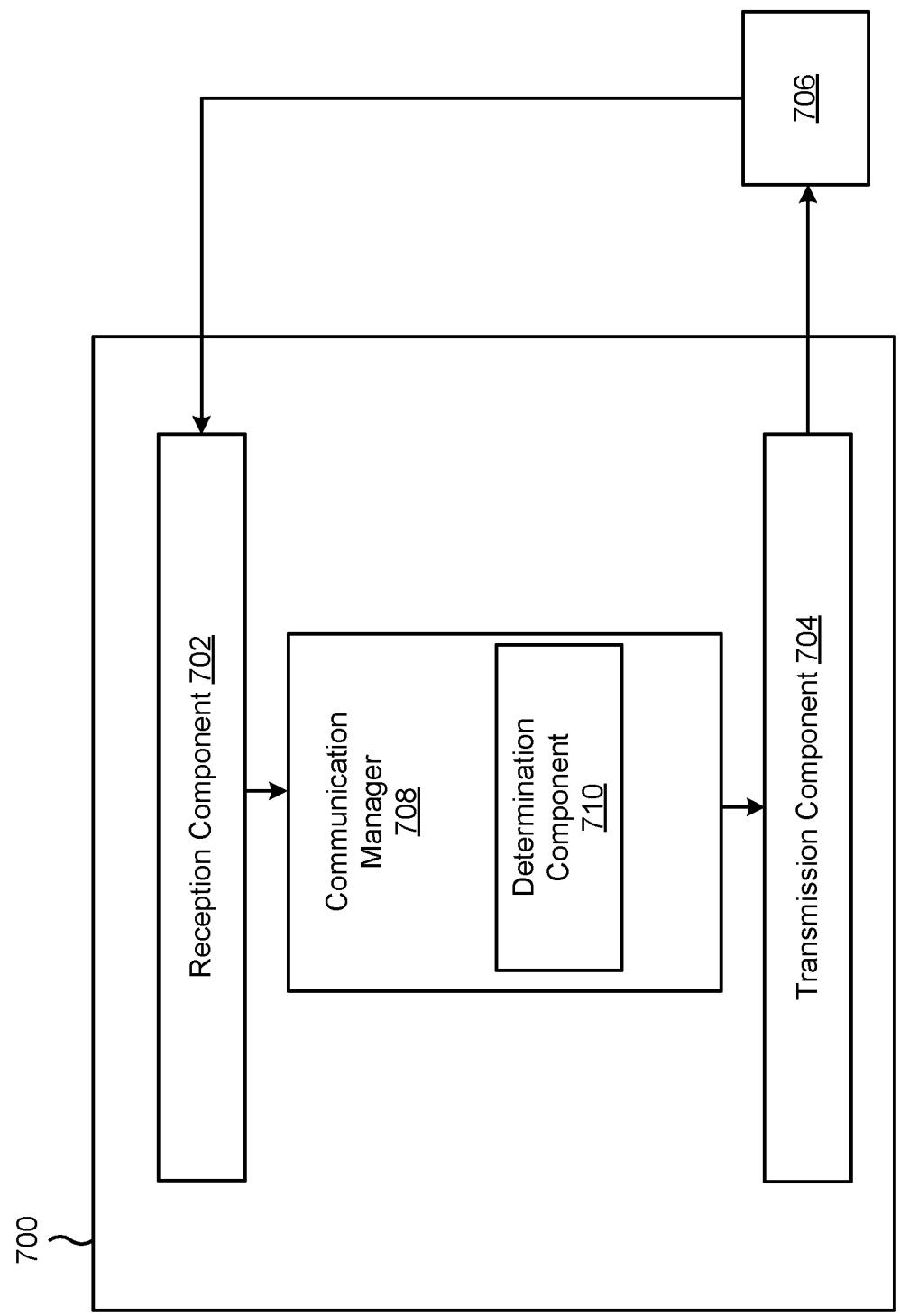
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a network node, or another wireless communication device) using the reception component 702 and the transmission component 704. As further shown, the apparatus 700 may include a communication manager 708. The communication manager 708 may include a determination component 710.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive, from a network node and prior to transmission of an RRC connection request message, a PTRS indication that indicates a presence of a PTRS. The transmission component 704 may transmit the RRC connection request message comprising the PTRS based at least in part on the PTRS indication. The reception component 702 may receive a PTRS indication configuration that indicates one or more rules for implicit indication of the presence of the PTRS.

The communication manager 708 may obtain a PTRS repetition configuration that indicates at least one parameter associated with transmitting a plurality of repetitions of the PTRS. The communication manager 708 also may facilitate any other communication action performed using the reception component 702 and/or the transmission component 704. In some aspects, the communication manager 708 may include one or more antennas, a modulator, a transmit MIMO processor, a transmit processor, a controller/processor, a memory, or a combination thereof, of the UE described above in connection with FIG. 2. In some aspects, the communication manager 708 may include the determination component 710, the reception component 702, and/or the transmission component 704.

The determination component 710 may determine a PTRS repetition configuration and/or satisfaction of an indication condition, among other examples. In some aspects, the determination component 710 may include one or more antennas, a modulator, a transmit MIMO processor, a transmit processor, a controller/processor, a memory, or a combination thereof, of the UE described above in connection with FIG. 2. In some aspects, the determination component 710 may include the reception component 702 and/or the transmission component 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
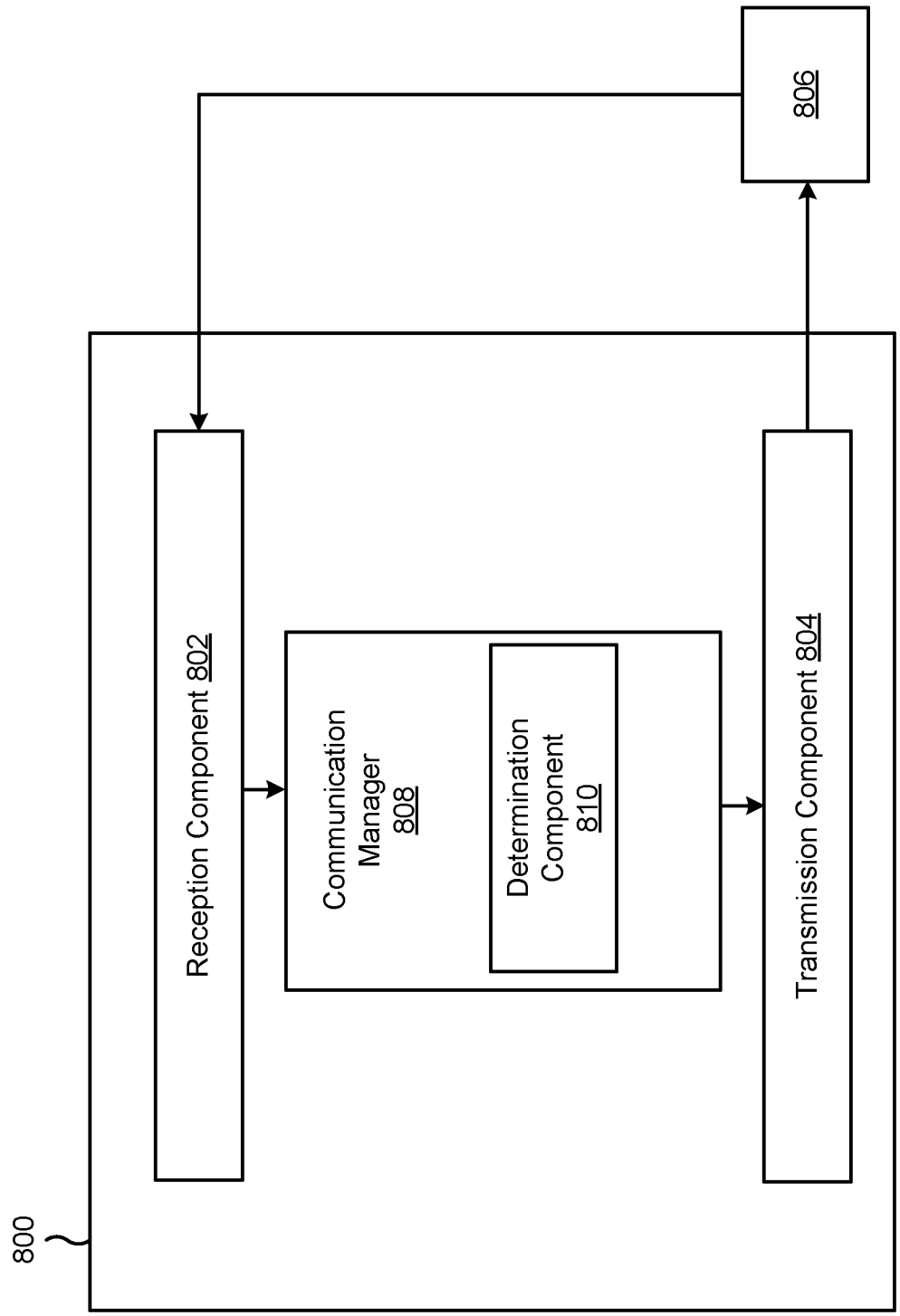

FIG. 8 is a block diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include a communication manager 808. The communication manager 808 may include a determination component 810.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit, to a UE and prior to transmission of an RRC connection request message, a PTRS indication that indicates a presence of a PTRS. The reception component 802 may receive the RRC connection request message comprising the PTRS based at least in part on the PTRS indication. The transmission component 804 may transmit a PTRS indication configuration that indicates one or more rules for implicit indication of the presence of the PTRS. The transmission component 804 may transmit system information that indicates the PTRS repetition configuration.

The determination component 810 may determine resources and/or parameters associated with one or more configurations (e.g., a PTRS indication configuration) and/or resource allocations, among other examples. In some aspects, the determination component 810 may include one or more antennas, a modulator, a transmit MIMO processor, a transmit processor, a controller/processor, a memory, or a combination thereof, of the base station described above in connection with FIG. 2. In some aspects, the determination component 810 may include the reception component 802 and/or the transmission component 804.

The communication manager 808 may generate one or more configurations (e.g., a PTRS indication configuration) and/or resource allocations, among other examples. In some aspects, the communication manager 808 may include one or more antennas, a modulator, a transmit MIMO processor, a transmit processor, a controller/processor, a memory, or a combination thereof, of the base station described above in connection with FIG. 2. In some aspects, the communication manager 808 may include the determination component 810, the reception component 802, and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a network node and prior to transmission of a radio resource control (RRC) connection request message, a phase tracking reference signal (PTRS) indication that indicates a presence of a PTRS; and transmitting the RRC connection request message comprising the PTRS based at least in part on the PTRS indication.

Aspect 2: The method of Aspect 1, wherein receiving the PTRS indication comprises receiving a random access response (RAR) that includes the PTRS indication.

Aspect 3: The method of Aspect 2, wherein receiving the PTRS indication comprises interpreting a bitfield of the RAR to identify the PTRS indication.

Aspect 4: The method of any of Aspects 1-3, wherein receiving the PTRS indication comprises receiving a physical downlink control channel (PDCCH) transmission that includes the PTRS indication, wherein the PDCCH transmission schedules a random access response.

Aspect 5: The method of Aspect 4, wherein receiving the PTRS indication comprises interpreting a bitfield of a downlink control information transmission corresponding to the PDCCH to identify the PTRS indication.

Aspect 6: The method of any of Aspects 1-5, wherein receiving the PTRS indication comprises receiving a physical downlink control channel (PDCCH) that includes the PTRS indication, wherein the PDCCH schedules a retransmission of the RRC connection request message.

Aspect 7: The method of Aspect 6, wherein receiving the PTRS indication comprises interpreting a bitfield of a downlink control information transmission corresponding to the PDCCH to identify the PTRS indication.

Aspect 8: The method of any of Aspects 1-7, wherein receiving the PTRS indication comprises receiving an indication of an RRC connection request message repetition.

Aspect 9: The method of any of Aspects 1-8, wherein receiving the PTRS indication comprises receiving an indication of a number of repetitions of the RRC connection request message.

Aspect 10: The method of any of Aspects 1-9, wherein receiving the PTRS indication comprises determining that an indicating condition is satisfied.

Aspect 11: The method of Aspect 10, wherein determining that the indicating condition is satisfied comprises determining that a consecutive pair of RRC connection request message repetitions include a first repetition associated with a first uplink slot and a second repetition associated with a second uplink slot, wherein at least one third uplink slot is disposed between the first uplink slot and the second uplink slot.

Aspect 12: The method of any of Aspects 1-11, further comprising receiving a PTRS indication configuration that indicates one or more rules for implicit indication of the presence of the PTRS.

Aspect 13: The method of Aspect 12, wherein receiving the PTRS indication configuration comprises receiving remaining minimum system information (RMSI).

Aspect 14: The method of Aspect 13, wherein receiving the RMSI comprises receiving a system information block (SIB) that indicates the RMSI.

Aspect 15: The method of any of Aspects 1-14, further comprising obtaining a PTRS repetition configuration that indicates at least one parameter associated with transmitting a plurality of repetitions of the PTRS.

Aspect 16: The method of Aspect 15, wherein the at least one parameter indicates at least one of a transmission time or a repetition frequency density.

Aspect 17: The method of either of Aspects 15 or 16, wherein obtaining the PTRS repetition configuration comprises receiving system information that indicates the PTRS repetition configuration.

Aspect 18: The method of any of Aspects 15-17, wherein the PTRS repetition configuration is indicated by a wireless communication standard.

Aspect 19: The method of any of Aspects 15-18, wherein the at least one parameter associated with transmitting the plurality of repetitions of the PTRS is based at least in part on at least one parameter associated with transmission of the RRC connection request message.

Aspect 20: The method of Aspect 19, wherein the at least one parameter associated with transmission of the RRC connection request message indicates at least one of: a number of repetitions of the RRC connection request message, a modulation and coding scheme, or a bandwidth.

Aspect 21: A method of wireless communication performed by a network node, comprising: transmitting, to a user equipment (UE) and prior to transmission of a radio resource control (RRC) connection request message, a phase tracking reference signal (PTRS) indication that indicates a presence of a PTRS; and receiving the RRC connection request message comprising the PTRS based at least in part on the PTRS indication.

Aspect 22: The method of Aspect 21, wherein transmitting the PTRS indication comprises transmitting a random access response (RAR) that includes the PTRS indication.

Aspect 23: The method of Aspect 22, wherein the PTRS indication is based at least in part on an interpretation of a bitfield of the RAR.

Aspect 24: The method of any of Aspects 21-23, wherein transmitting the PTRS indication comprises transmitting a physical downlink control channel (PDCCH) transmission that includes the PTRS indication, wherein the PDCCH transmission schedules a random access response.

Aspect 25: The method of Aspect 24, wherein the PTRS indication is based at least in part on an interpretation of a bitfield of a downlink control information transmission corresponding to the PDCCH.

Aspect 26: The method of any of Aspects 21-25, wherein transmitting the PTRS indication comprises transmitting a physical downlink control channel (PDCCH) that includes the PTRS indication, wherein the PDCCH schedules a retransmission of the RRC connection request message.

Aspect 27: The method of Aspect 26, wherein the PTRS indication is based at least in part on an interpretation of a bitfield of a downlink control information transmission corresponding to the PDCCH.

Aspect 28: The method of any of Aspects 21-27, wherein transmitting the PTRS indication comprises transmitting an indication of an RRC connection request message repetition.

Aspect 29: The method of any of Aspects 21-28, wherein transmitting the PTRS indication comprises transmitting an indication of a number of repetitions of the RRC connection request message.

Aspect 30: The method of any of Aspects 21-29, wherein the PTRS indication is based at least in part on a determination that an indicating condition is satisfied.

Aspect 31: The method of Aspect 30, wherein the determination that the indicating condition is satisfied is based at least in part on a determination that a consecutive pair of RRC connection request message repetitions include a first repetition associated with a first uplink slot and a second repetition associated with a second uplink slot, wherein at least one third uplink slot is disposed between the first uplink slot and the second uplink slot.

Aspect 32: The method of any of Aspects 21-31, further comprising transmitting a PTRS indication configuration that indicates one or more rules for implicit indication of the presence of the PTRS.

Aspect 33: The method of Aspect 32, wherein transmitting the PTRS indication configuration comprises transmitting remaining minimum system information (RMSI).

Aspect 34: The method of Aspect 33, wherein transmitting the RMSI comprises transmitting a system information block (SIB) that indicates the RMSI.

Aspect 35: The method of any of Aspects 21-34, wherein a PTRS repetition configuration indicates at least one parameter associated with transmitting a plurality of repetitions of the PTRS.

Aspect 36: The method of Aspect 35, wherein the at least one parameter indicates at least one of a transmission time or a repetition frequency density.

Aspect 37: The method of either of Aspects 35 or 36, further comprising transmitting system information that indicates the PTRS repetition configuration.

Aspect 38: The method of any of Aspects 35-37, wherein the PTRS repetition configuration is indicated by a wireless communication standard.

Aspect 39: The method of any of Aspects 35-38, wherein the at least one parameter associated with transmitting the plurality of repetitions of the PTRS is based at least in part on at least one parameter associated with transmission of the RRC connection request message.

Aspect 40: The method of Aspect 39, wherein the at least one parameter associated with transmission of the RRC connection request message indicates at least one of: a number of repetitions of the RRC connection request message, a modulation and coding scheme, or a bandwidth.

Aspect 41: An apparatus for wireless communication at a device, comprising a processor; memory coupled with the processor; and instructions stored in the memory and executable by the processor to cause the apparatus to perform the method of one or more of Aspects 1-20.

Aspect 42: A device for wireless communication, comprising a memory and one or more processors coupled to the memory, the memory and the one or more processors configured to perform the method of one or more of Aspects 1-20.

Aspect 43: An apparatus for wireless communication, comprising at least one means for performing the method of one or more of Aspects 1-20.

Aspect 44: A non-transitory computer-readable medium storing code for wireless communication, the code comprising instructions executable by a processor to perform the method of one or more of Aspects 1-20.

Aspect 45: A non-transitory computer-readable medium storing a set of instructions for wireless communication, the set of instructions comprising one or more instructions that, when executed by one or more processors of a device, cause the device to perform the method of one or more of Aspects 1-20.

Aspect 46: An apparatus for wireless communication at a device, comprising a processor; memory coupled with the processor; and instructions stored in the memory and executable by the processor to cause the apparatus to perform the method of one or more of Aspects 21-40.

Aspect 47: A device for wireless communication, comprising a memory and one or more processors coupled to the memory, the memory and the one or more processors configured to perform the method of one or more of Aspects 21-40.

Aspect 48: An apparatus for wireless communication, comprising at least one means for performing the method of one or more of Aspects 21-40.

Aspect 49: A non-transitory computer-readable medium storing code for wireless communication, the code comprising instructions executable by a processor to perform the method of one or more of Aspects 21-40.

Aspect 50: A non-transitory computer-readable medium storing a set of instructions for wireless communication, the set of instructions comprising one or more instructions that, when executed by one or more processors of a device, cause the device to perform the method of one or more of Aspects 21-40.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a network node and prior to transmission of a radio resource control (RRC) connection request message, a phase tracking reference signal (PTRS) indication that indicates a presence of a PTRS; and
   transmitting the RRC connection request message comprising the PTRS based at least in part on the PTRS indication.

2. The method of claim 1, wherein receiving the PTRS indication comprises receiving a random access response (RAR) that includes the PTRS indication.

3. The method of claim 2, wherein receiving the PTRS indication comprises interpreting a bitfield of the RAR to identify the PTRS indication.

4. The method of claim 1, wherein receiving the PTRS indication comprises receiving a physical downlink control channel (PDCCH) transmission that includes the PTRS indication, wherein the PDCCH transmission schedules a random access response.

5. The method of claim 4, wherein receiving the PTRS indication comprises interpreting a bitfield of a downlink control information transmission corresponding to the PDCCH to identify the PTRS indication.

6. The method of claim 1, wherein receiving the PTRS indication comprises receiving a physical downlink control channel (PDCCH) that includes the PTRS indication, wherein the PDCCH schedules a retransmission of the RRC connection request message.

7. The method of claim 6, wherein receiving the PTRS indication comprises interpreting a bitfield of a downlink control information transmission corresponding to the PDCCH to identify the PTRS indication.

8. The method of claim 1, wherein receiving the PTRS indication comprises receiving an indication of an RRC connection request message repetition.

9. The method of claim 1, wherein receiving the PTRS indication comprises receiving an indication of a number of repetitions of the RRC connection request message.

10. The method of claim 1, wherein receiving the PTRS indication comprises determining that an indicating condition is satisfied.

11. The method of claim 10, wherein determining that the indicating condition is satisfied comprises determining that a consecutive pair of RRC connection request message repetitions include a first repetition associated with a first uplink slot and a second repetition associated with a second uplink slot, wherein at least one third uplink slot is disposed between the first uplink slot and the second uplink slot.

12. The method of claim 1, further comprising receiving a PTRS indication configuration that indicates one or more rules for implicit indication of the presence of the PTRS.

13. The method of claim 12, wherein receiving the PTRS indication configuration comprises receiving remaining minimum system information (RMSI).

14. The method of claim 13, wherein receiving the RMSI comprises receiving a system information block (SIB) that indicates the RMSI.

15. The method of claim 1, further comprising obtaining a PTRS repetition configuration that indicates at least one parameter associated with transmitting a plurality of repetitions of the PTRS.

16. The method of claim 15, wherein the at least one parameter indicates at least one of a transmission time or a repetition frequency density.

17. The method of claim 15, wherein obtaining the PTRS repetition configuration comprises receiving system information that indicates the PTRS repetition configuration.

18. The method of claim 15, wherein the PTRS repetition configuration is indicated by a wireless communication standard.

19. The method of claim 15, wherein the at least one parameter associated with transmitting the plurality of repetitions of the PTRS is based at least in part on at least one parameter associated with transmission of the RRC connection request message.

20. The method of claim 19, wherein the at least one parameter associated with transmission of the RRC connection request message indicates at least one of:
   a number of repetitions of the RRC connection request message,
   a modulation and coding scheme, or
   a bandwidth.

21. A method of wireless communication performed by a network node, comprising:
   transmitting, to a user equipment (UE) and prior to transmission of a radio resource control (RRC) connection request message, a phase tracking reference signal (PTRS) indication that indicates a presence of a PTRS; and
   receiving the RRC connection request message comprising the PTRS based at least in part on the PTRS indication.

22. The method of claim 21, wherein transmitting the PTRS indication comprises transmitting a random access response (RAR) that includes the PTRS indication, and wherein the PTRS indication is based at least in part on an interpretation of a bitfield of the RAR.

23. The method of claim 21, wherein transmitting the PTRS indication comprises transmitting a physical downlink control channel (PDCCH) transmission that includes the PTRS indication, wherein the PDCCH transmission schedules a random access response, and wherein the PTRS indication is based at least in part on an interpretation of a bitfield of a downlink control information transmission corresponding to the PDCCH.

24. The method of claim 21, wherein transmitting the PTRS indication comprises transmitting a physical downlink control channel (PDCCH) that includes the PTRS indication, wherein the PDCCH schedules a retransmission of the RRC connection request message, and wherein the PTRS indication is based at least in part on an interpretation of a bitfield of a downlink control information transmission corresponding to the PDCCH.

25. The method of claim 21, wherein transmitting the PTRS indication comprises transmitting an indication of an RRC connection request message repetition.

26. The method of claim 21, wherein transmitting the PTRS indication comprises transmitting an indication of a number of repetitions of the RRC connection request message.

27. The method of claim 21, wherein the PTRS indication is based at least in part on a determination that an indicating condition is satisfied, wherein the determination that the indicating condition is satisfied is based at least in part on a determination that a consecutive pair of RRC connection request message repetitions include a first repetition associated with a first uplink slot and a second repetition associated with a second uplink slot, and wherein at least one third uplink slot is disposed between the first uplink slot and the second uplink slot.

28. The method of claim 21, wherein a PTRS repetition configuration indicates at least one parameter associated with transmitting a plurality of repetitions of the PTRS, and wherein the at least one parameter indicates at least one of a transmission time or a repetition frequency density.

29. A user equipment (UE) for wireless communication, comprising:
   one or more memories; and
   one or more processors, coupled to the one or more memories, configured to cause the UE to:
      receive, from a network node and prior to transmission of a radio resource control (RRC) connection request message, a phase tracking reference signal (PTRS) indication that indicates a presence of a PTRS; and
      transmit the RRC connection request message comprising the PTRS based at least in part on the PTRS indication.

30. A network node for wireless communication, comprising:
   one or more memories; and
   one or more processors, coupled to the one or more memories, configured to cause the network node to:
      transmit, to a user equipment (UE) and prior to transmission of a radio resource control (RRC) connection request message, a phase tracking reference signal (PTRS) indication that indicates a presence of a PTRS; and
      receive the RRC connection request message comprising the PTRS based at least in part on the PTRS indication.

* * * * *